United States Patent [19]
Tappert

[11] Patent Number: 4,731,857
[45] Date of Patent: Mar. 15, 1988

[54] RECOGNITION SYSTEM FOR RUN-ON HANDWRITTEN CHARACTERS

[75] Inventor: Charles C. Tappert, Ossining, N.Y.

[73] Assignee: International Business Machines Corporation, Armonk, N.Y.

[21] Appl. No.: 926,837

[22] Filed: Nov. 3, 1986

Related U.S. Application Data

[63] Continuation of Ser. No. 626,254, Jun. 29, 1984, abandoned.

[51] Int. Cl.[4] .............................................. G06K 9/62
[52] U.S. Cl. ........................................... 382/9; 382/13
[58] Field of Search .................... 382/9, 13, 37, 38, 40, 382/24

[56] References Cited

U.S. PATENT DOCUMENTS

| | | | |
|---|---|---|---|
| 4,284,975 | 8/1981 | Odaka | 382/13 |
| 4,317,109 | 2/1982 | Odaka et al. | 382/13 |
| 4,365,235 | 12/1982 | Greanias et al. | 382/13 |
| 4,542,526 | 9/1985 | Satoh et al. | 382/13 |
| 4,561,105 | 12/1985 | Crane et al. | 382/13 |

*Primary Examiner*—Leo H. Boudreau
*Attorney, Agent, or Firm*—Sughrue, Mion, Zinn, Macpeak and Seas

[57] ABSTRACT

A method of processing a word with the segmentation and recognition steps combined into an overall scheme. This is accomplished by a three step procedure. First, potential or trail segmentation points are derived. This is done in a manner so as to ensure that essentially all true segmentation points are present but also includes extra or not true segmentation points. Second, all combinations of the segments that could reasonably be a character are sent to a character recognizer to obtain ranked choices and corresponding scores. Finally, the recognition results are sorted and combined so that the character sequences having the best cummulative scores are obtained as the best word choices. For a particular word choice there is a corresponding character segmentation, simply the segment combinations that resulted in the chosen characters. With this recognition scheme the initial character segmentation is not final and need not be highly accurate, but is subject to a lesser constraint of containing the true segmentation points.

5 Claims, 6 Drawing Figures

FIG.1  *LETTERS ARE RUN TOGETHER*

RECOGNITION SYSTEM FOR RUN-ON HANDWRITTEN CHARACTERS

This is a continuation of Ser. No. 626,254, filed on Jun. 29, 1984. Now abandoned.

BACKGROUND OF THE INVENTION

This invention is related to the field of character recognition and specifically to systems for recognizing run-on handwritten characters. In recognition systems utilizing handwritten characters as input, an important consideration is the recognition of individual letters which may be formed using segments which run-on neighboring letters. A major problem in such recognition systems is the segmentation of the words into characters which may be suitable for a recognition algorithm which operates on characters. Techniques of whole word recognition are possible but highly impractical.

Run-on handwritten characters are handwritten characters which are run together, that is, they can touch or overlap one another. Although only adjacent characters normally display this touching or overlapping, more distant characters can also take on this characteristic. For example, a t-crossing can sometimes overlap several adjacent characters. Handprinting often has this run-on characteristic and is normally characterized by both touching and overlapping characters. Cursive script writing can also be considered run-on handwriting. The individual characters can be considered to touch through their connections by ligatures. Furthermore, the characters in cursive writing can overlap. As with handprinting such overlap usually involves adjacent characters and again t is an example of where this occurs with relatively high frequency.

The reason run-on handwriting is difficult for automatic recognition procedures is that the characters cannot be easily or accurately separated one from another. In order to segment the characters from each other some recognition is required, and in order to recognize the characters some segmentation is required. Therefore, these two processes of segmentation and recognition are not independent but are heavily interrelated. Nevertheless, prior work in this area was directed toward the development of essentially separate procedures for the segmentation and subsequent recognition of the characters. This is referred to as the segmentation-then-recognition approach.

Reference is made to U.S. Pat. No. 3,111,646 relating to a method and apparatus for reading cursive script. The algorithm and hardware for implementation presupposes that the writing itself be well-proportioned. Consequently, the segmentation algorithm is unduly restrictive. Specifically, the algorithm determines various zones by taking the overall height of an entire line from the base of the descenders to the peaks of the ascenders and divides the heights as shown in FIGS. 1 and 2 into four parts for use in the recognition system. Consequently, the algorithm requires that the input be very well proportioned and that the writing not slope or deviate from the base line. Handwriting, however, is highly variable; in practice, the heights of ascenders and descenders are simply matters of personal style and subject to nearly infinite variations. The absolute length of an ascender or descender is not of great importance to humans in their handwriting styles. Consequently, the definition of well-proportioned handwriting is not a trait found in typical handwriting samples. The segmentation algorithm of U.S. Pat. No. 3,111,646 is retrospective. In operation, an entire line of script is fed into storage registers and segmentation points are determined by first determining the average letter width based principally on the number of zero axis crossings.

This approach has a number of drawbacks in addition to the restrictions on input script. For example, the technique requires that the input be very well proportioned, that is that the writer maintain substantially the same letter width throughout. Secondly, the technique is not sequential. The prior art first segments the characters constituting the line then attempts recognition. For a practical system, it is important that segmentation and recognition be done in "real time". That is, an operative system should display the results as soon as possible after the character is formed.

Segmentation in itself is an extremely difficult problem when dealing with connected written script. The form of the ligature depends not only on the two characters being joined, the overall context, but additional general factors such as fatigue and physical conditions under which writing is done, that is sitting, standing or the like which may change the handwriting of an individual. The prior art contains examples of segmentation schemes for cursive script.

Reference is made to U.S. Pat. Nos. 3,334,399, 3,305,832 and 4,024,500 all concerned with techniques of character segmentation in cursive script handwriting. Those systems are all predicated on ligatures being defined in essentially a continuum of the characters.

IBM Technical Disclosure Bulletin, Vol. 24, No. 6, pages 2897–2902, describes a system for recognizing discretely written characters based on elastic matching of an unknown character against a set of character prototypes. The input to the system is point data produced by a dynamic trace of a stylus on an electronic tablet. The hardware configuration is shown in FIG. 1 of that TDB. Processing in accordance with this elastic matching system is performed on a character by character basis after the writing is separated into characters. The assumption of the recognition technique disclosed is that the characters are written with sufficient space between them to allow separation prior to recognition. Consequently, the algorithm described is a segmentation-then-recognition approach. Decoding utilizing this scheme cannot be accomplished where the characters run together. Other techniques utilizing segmentation followed by recognition are typified by U.S. Pat. Nos. 3,713,100 and 3,784,982.

SUMMARY OF INVENTION

Prior art techniques dealing with written characters do not lend themselves to defining appropriate segmentation systems when dealing with run-on handwritten characters. The problem of character run-on is typical when dealing with hand printed characters. This invention relates specifically to a character recognizer for such handwritten characters and specifically to one utilizing printed characters. This invention departs from the prior art by utilizing an algorithm which solves the problem of recognizing or determining the end of one character and the beginning of the next where the characters are run-on or overlapped. Methodology employed by the present invention assumes that although the characters may overlap, each character is written discretely and completed before starting the next character. Because each character terminates at a stroke end, the present invention does not initially attempt to segment by characters, but rather considers all stroke ends as possible character segmentation points. Consequently, no potential character segmentation point is missed although there are extra tests made for characters consisting of more than one stroke.

This invention allows for stroke sequences up to a specified maximum number, defined as "max stroke" to be processed by the recognizer sub-system. At each potential segmentation point, the previous stroke, the previous two strokes, etc., up to the previous "max-stroke" strokes are delivered to the recognizer for potential recognition. During a sequence of recognition, the recognizer will produce a number of possible candidates for any given string of input data which is sorted and alternatively examined. This sorting and alternative examination applies the technique of "best cumulative score" to produce best word candidates.

The recognizer will provide multiple best word candidates. However, some strings of letters cannot be a part of a valid word. In accordance with the present invention, invalid best word candidates can be striken from the recognition processor by use of dictionary look-up. Furthermore, syntactic and semantic processing techniques can be applied in a situation where ambiguities arise and no clear choice can be made by the recognizer without the use of such contextual processing.

The approach taken by this invention is to operate on one handwritten word at a time and, within the processing of a word, to combine the segmentation and recognition steps into an overall scheme. It is assumed that the words are separated prior to processing by the proposed scheme. This separation can be performed in a number of ways. For example, a spatial segmenter could separate the words based on the spacing of the words. It is generally recognized that such segmentation of words is easy relative to the segmentation of characters within a word. Another method which could be employed to separate words would be to have the writer pause between the writing of the words and segment the words temporally. The critical notion here is to segment the handwritten words first and then perform the character segmentation and recognition operations in a combined manner on the word units.

Within the processing of a word the segmentation and recognition steps are combined into an overall scheme. Basically, this is accomplished by a three step procedure. First, potential or trial segmentation points are derived. This is done in a manner so as to ensure that essentially all true segmentation points are present but with the tradeoff that extra or not true segmentation points can be obtained as well. Second, all combinations of the segments that could reasonably be a character are sent to a character recognizer to obtain ranked choices and corresponding scores. Finally, the recognition results are sorted and combined so that the character sequences having the best cumulative scores are obtained as the best word choices. For a particular word choice there is a corresponding character segmentation, simply the segment combinations that resulted in the chosen characters. One of the main advantages of this recognition scheme is that the initial character segmentation is not final and need not be highly accurate, but is subject to a lesser constraint of containing all the true segmentation points.

This invention will be described in greater detail by referring to the drawings and the description of the preferred embodiment that follows.

BRIEF DESCRIPTION OF THE DRAWINGS

FIG. 1 is an example of run-on handprinted characters of the type subject to recognition in accordance with the present invention;

DESCRIPTION OF THE PREFERRED EMBODIMENT

Figure 2:
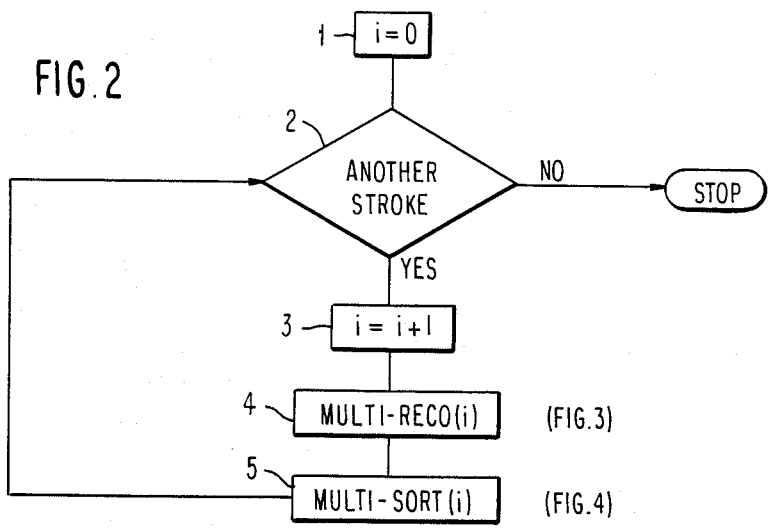
FIG. 2 is a flow chart setting forth the main procedure utilized by this invention.

An example of run-on handprinted characters of the type recognized by the present invention is illustrated in FIG. 1. As represented thereon, various letters overlap with neighboring letters.

Prior concepts of segmentation whether it be for handwritten cursive script or discrete letters cannot handle the case of run-on letters. In accordance with this invention, a handwritten character is defined as one consisting of one or more strokes. A stroke is defined as the writing from a pendown position onto the writing surface to a pen-up position. Typically, the input device is in the form of an electronic pen and tablet of the type known in the prior art and disclosed in IBM/TDB volume 24, No. 6, pages 2897–2902. Such an electronic pen and tablet is typical of input devices that are well known in the prior art. In accordance with this invention, the system considers as potential character segmentation points all stroke ends within a word. Consequently, unlike techniques for deciphering script, the present invention recognizes resulting pieces and then combines the recognitions on a cumulative basis to obtain the best fitting sequence of characters for the word. The recognition procedure utilized relative to an individual piece is that set forth in the above reference IBM Technical Disclosure Bulletin.

Consequently, in accordance with this invention, while the characters themselves may overlap, it is assumed that each character is written discretely and that a character is completed before starting the next character. Unlike script writing where a word may be completed and then the author goes back and "dots the i's and crosses the t's", handwritten letters are generally completed one at a time. Thus, each character is written discretely and that character is completed in full before the next character is begun. Because each character in a handwritten letter terminates with a stroke end, the present invention considers all stroke ends as possible character segmentation points. Thus, no character segmentation point is missed, although it will be appreciated that there are extra ones for characters consisting of more than one stroke. The recognizer, as in the case of the prior cited IBM TDB utilizes prototypes consisting of characters. Some characters consist of several strokes and therefore various stroke sequences must be sent to the recognizer.

This invention allows for stroke sequences up to a maximum number of strokes. This maximum number denoted herein as "max-stroke" is predetermined and allows for setting of stroke sequences to be processed by the recognizer. The number utilized as "max-stroke" is set to be the maximum number of strokes of a character in the alphabet employed. Thus, at each potential segmentation point, the preceding stroke and the preceding two strokes, etc., up to the preceding number denoted as "max-stroke" strokes are sent to the recognizer. The system is, therefore, variable depending on the alphabet which is being recognized. The recognizer's candidate characters and scores are then sorted and the sequences of candidate characters yielding the best cumulative scores are output as the best scoring candidates. Thus, in accordance with the present invention, the scores are determined as the difference between the candidate and the prototype.

By referring to FIG. 2, a flow chart of the main procedure utilizing this invention is depicted.

The current stroke number is controlled by i. This is also the current segmentation point index. For each stroke, the segmentation point is the last coordinate point of the stroke. In line 1, the stroke index "i" is initialized to 0 to begin the routine. A request is made for another stroke of the word, line 2. If there are no further strokes of the word, processing terminates. Otherwise, the stroke index is incremented by 1 in line 3. The routine continues utilizing the subroutine "multi-reco" in line 4. This subroutine, shown in FIG. 3, performs various recognitions on stroke sequences ending with stroke i.

The last step (line 5) in the main routine utilizes the subroutine multi-sort. This subroutine, shown in FIG. 4, sorts various recognition results. Following the multi-sort subroutine processing continues in an iterative manner by receiving a subsequent stroke, indexing the index of segmentation points, and invoking the subroutines, such that for each segmentation point of the word an iterative process occurs. When processing terminates, the word choices are simply character string choices found in the last list generated by this subroutine.

Figure 3:
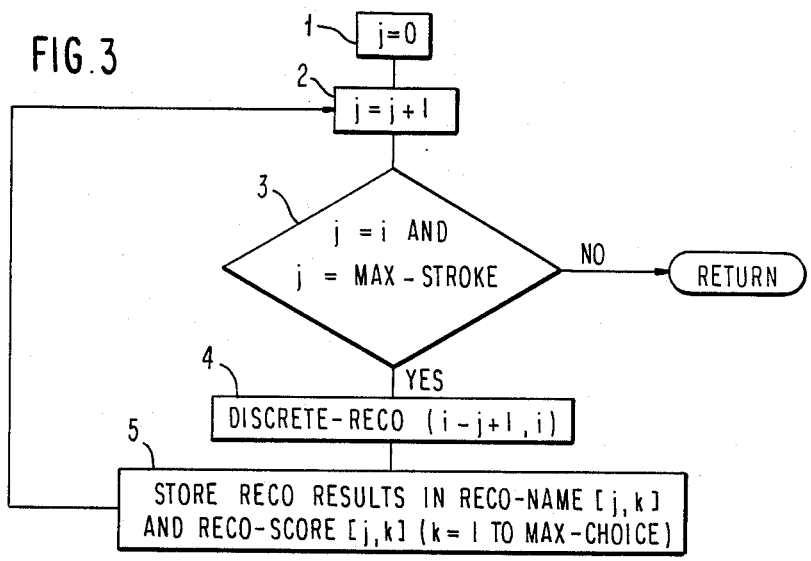
FIG. 3 is a flow chart of the subroutine multi-reco set forth in the main procedure flow chart of FIG. 2.

Referring now to FIG. 3, operation of the subroutine multi-reco will be described. The number of strokes to be sent to the character recognizer is controlled by "j". The number of strokes is initially set to 0 in line 1 and then incremented by 1 in line 2 and tested to see if the number of strokes exceeds the preset max-stroke. The test, as shown in line 3, is such that if "j" exceeds max-stroke or if "j" exceeds "i", processing terminates and a return in made to the main program, shown in FIG. 2, so that the next step, multi-sort, can be accomplished.

A subroutine "discrete-reco" is called in line 4 to process the sequence of "j" strokes from stroke i−j+1 to stroke i. This subroutine is disclosed in IBM Technical Disclosure Bulletin, Vol. 24, No. 6, pages 2897-2902.

This subroutine processes the sequence of j strokes ending in the i-th stroke. The results are a listing of candidate characters and scores for the number of candidate choices from the discrete-reco subroutine. The number of candidate choices is shown in FIG. 3 at "max-choice". Thus, a matrix is formed in line 5 wherein the reco results are determined in terms of the array of candidate characters, "reco-name", and the array of scores corresponding to candidate characters, "reco-score". The subroutine shown in FIG. 3 is iterative such that processing continues until all stroke sequences up to the max-stroke are processed.

Figure 4:
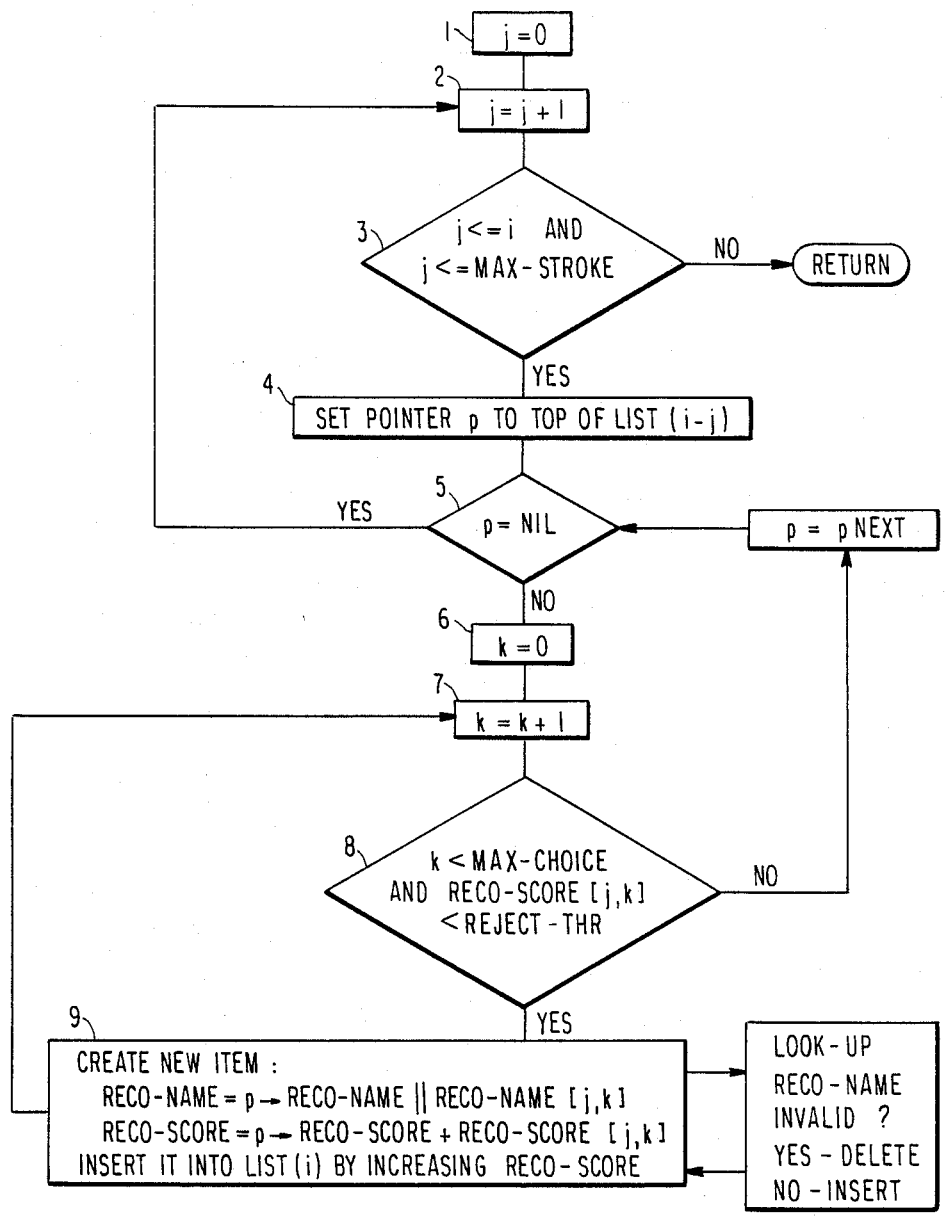
FIG. 4 is a flow chart of the subroutine multi-sort as set forth in the flow chart of the main routine.

Referring now to FIG. 4, the subroutine multi-sort is illustrated. This subroutine is employed to generate cumulative scores as processing continues. Thus, following each stroke, determination is made of the best character sequence choices up to and including that stroke. The index "j" is used here to access the recognition results from the processing of "j" strokes by subroutine multi-reco. The index j is initialized to 0 in line 1, incremented by 1 in line 2, and tested in line 3 to determine whether it exceeds the preset max-stroke. If j exceeds "max-stroke" or if j exceeds i, processing terminates and a return in made to the main program shown in FIG. 2. As shown in line 4, pointer p is set to the top of the list of cumulative recognition results up to and including stroke (i-j). Data items on the list then consist of a character sequence, termed "reco-name", a cumulative score, termed "reco-score", and a pointer to the next item, p next. In line 5, p is tested to determine whether it is NIL and, if so, processing is then iterated back to line 2 where j is incremented. Otherwise, processing continues to build up the list (i). Choice index (k) is initialized to 0 in line 6 and is incremented by 1 in the succeeding line. It is then tested to determine whether it is less than max-choice and whether the current reco-score is less than a reject threshold. This is shown in line 8 of the subroutine. If k is less than max-choice and if the current reco-score is less than the reject threshold, a new item is created and inserted into the list (i) in order of increasing reco-score. This is illustrated in line 9. Otherwise, p is set to p next and processing returns to line 5.

In accordance with the present invention, various techniques may be utilized to save storage in the system. For example, the number of items retained in the list generated by the subroutine multi-sort in FIG. 4 need be only as many as the number of desired word choices. Also, although the number of lists created is equal to the number of segementation points (strokes), only the previous max-stroke lists are required. Therefore, earlier ones are eliminated as the procedures steps through the strokes.

Additionally, dictionary look-up and syntactic and semantic processing may be used to eliminate letter-chain choices for which no valid word exists. Thus, as items are created, they may be tested to determine whether a valid word can be generated utilizing the letter combination represented in that item. By this technique, storage requirements may be minimized.

Figure 5:
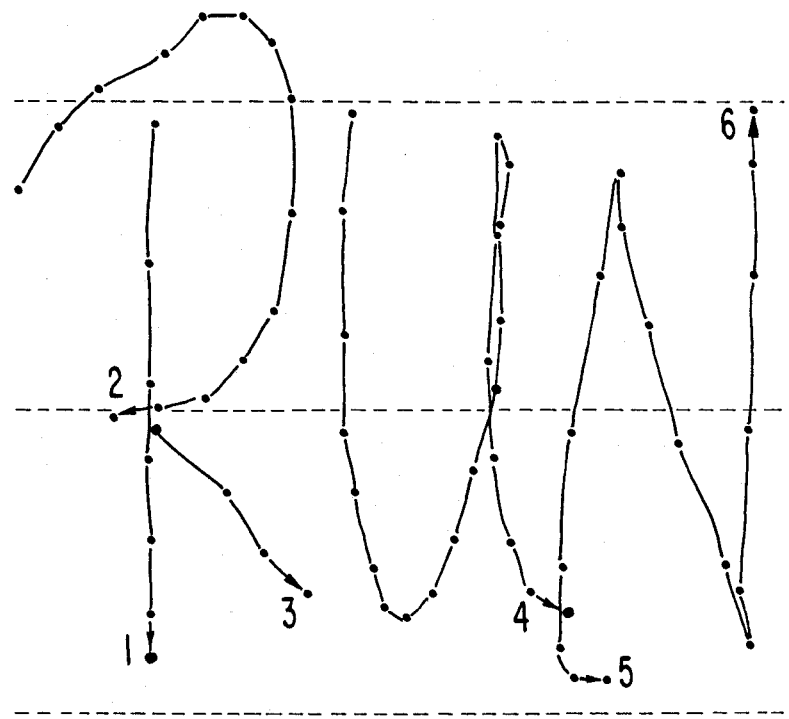
FIG. 5 is a machine representation of the word "RUN" indicating the sequence of strokes.

Two examples of the processing performed by this invention will be described relative to the words "RUN" shown in FIG. 5 and "TOGETHER" shown in FIG. 6. FIG. 5 illustrates a machine representation of the run-on word "RUN" shown in FIG. 1. Note that in this word, the characters U and N overlap. This description will be made in the context of the following table which is the recognition output for the word "RUN".

|          |         | RUN     |
|----------|---------|---------|
| Stroke 1 | 1       |         |
|          | L ( 90) |         |
|          | i (142) |         |
| L 90     | i 142   |         |
| Stroke 2 | 2       | 1-2     |
|          | P (298) | P (170) |
|          |         | D (246) |

RUN (continued)

| | | | | |
|---|---|---|---|---|
| | | F (342) | | |
| P 170 | D 246 | F 342 | R 343 | LP 388 |
| Stroke 3 | 3 | 2-3 | 1-2-3 | |
| | | R (294) | R (222) | |
| | | Z (336) | B (346) | |
| | | | P (349) | |
| R 222 | B 346 | P 349 | D 364 | LR 384 |
| Stroke 4 | 4 | 3-4 | 2-3-4 | 1-2-3-4 |
| | U (123) | U (327) | Q (811) | |
| | u (235) | u (383) | | |
| | d (253) | d (417) | | |
| RU 345 | Ru 457 | BU 469 | PU 472 | Rd 476 |
| Stroke 5 | 5 | 4-5 | 3-4-5 | 2-3-4-5 |
| | L (69) | U (297) | U (475) | |
| | c (142) | u (380) | u (540) | |
| | o (151) | d (412) | d (559) | |
| RUL 414 | RUc 487 | RUo 496 | RUi 499 | RU 520 |
| Stroke 6 | 6 | 5-6 | 4-5-6 | 3-4-5-6 |
| | V (89) | N (147) | W (567) | W (799) |
| | r (150) | V (291) | m (862) | |
| | v (153) | W (291) | | |
| RUN 492 | RULV 503 | RULr 564 | RUcV 576 | RULv 567 |

As shown in FIG. 5, the word consists of six strokes which are numbered. The first stroke is the vertical downward line. The Table shows that for the first stroke, the recognizer assigned scores for a L of 90 and for a i of 142. Given the fact that only 1 stroke was involved, the summary line prints out the two candidate characters and those associated scores as the output of the multi-sort routine.

The second stroke, as shown in FIG. 5, is the clockwise half loop. Considering the second stroke, the system then classifies the second stroke alone and the combination of the first and second strokes. Classifications of preceding stroke sequences up to the max-stroke limit are then assessed with the best character string choices determined after completion of the stroke just prior to the classified stroke sequence. In this particular example, the max-stroke limit is 4, as illustrated relative to strokes 4, 5 and 6. The multi-sort routine then considers the lowest cumulative score and sets forth the candidate characters. Operation proceeds considering, for example, after stroke 6 the single stroke itself as shown in FIG. 5, would be recognized as a V. However, the stroke sequence of strokes 5 and 6 is recognized as a N. The current best character string choices represent the lowest cumulative scores obtained. For example, in stroke 4, the RU sequence is a combination of the R choice relative to stroke 3 having a cumulative score of 222 and the U choice in stroke 4 having a score of 123, yielding a cumulative score of 345. This is then assessed by the multi-sort subroutine as the best character string choice to that point. In stroke 6, the word RUN is assessed as the combination of RU relative to cumulative score of 345 at stroke 4 and the recognized N in strokes 5-6, with a score of 147, yielding a composite score of 492.

As shown in the above Table, the best word choices following the sixth stroke are RUN, RULV, etc. For sake of clarity, in this Table, the printing of recognition choices of stroke sequence was limited to 3 and printing of the best character sequences limited to 5. The system is capable of retaining more information. Also, as noted, the alphabet was limited to upper and lower case printed characters in this example. Again, using elastic matching techniques, other characters may be input for recognition.

Figure 6:
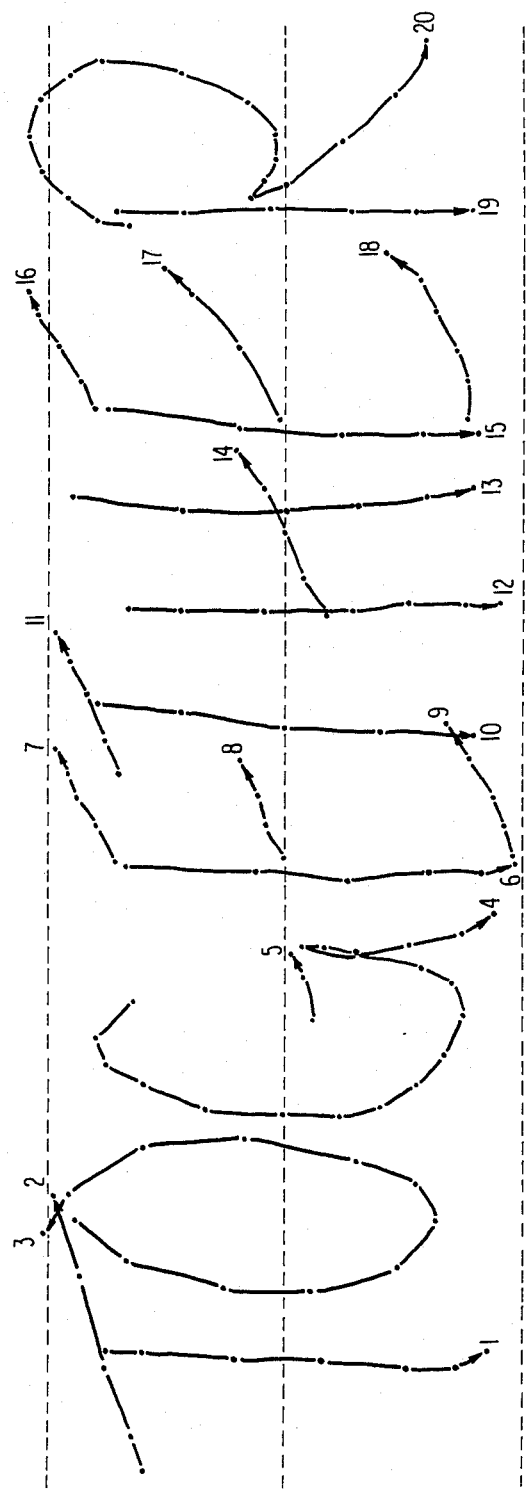
FIG. 6 is a machine representation of the word "TOGETHER" indicating the sequence of stokes for that word.

A second example, the use of the character recognition scheme in accordance with this invention, is illustrated in FIG. 6 wherein the word TOGETHER has been printed in a run-on form. Note that the adjacent characters T and O and also E and T overlap. The word as formed has 20 segmentation strokes. Each of those strokes is analyzed and shown in the following Table in a manner identical to the analysis of RUN in the preceding example. The analysis is simply extended given the fact that twenty strokes, instead of six, are involved.

TOGETHER

| | | | | | | | |
|---|---|---|---|---|---|---|---|
| Segment 1 | | 1 | | | | | |
| | | L | ( 87) | | | | |
| | | Y | ( 131) | | | | |
| L 87 | Y 131 | | | | | | |
| Segment 2 | | 2 | | 1-2 | | | |
| | | | | T ( 90) | | | |
| | | | | J ( 142) | | | |
| | | | | V ( 219) | | | |
| T 90 | J 142 | V 219 | | | | | |
| Segment 3 | | 3 | | 2-3 | 1-2-3 | | |
| | | O | ( 120) | O (352) | N ( 355) | | |
| | | V | ( 174) | V (368) | W ( 410) | | |
| | | N | ( 213) | | | | |
| TO 210 | JO 262 | TV 264 | | TN 303 | JV 317 | VO 339 | |
| Segment 4 | | 4 | | 3-4 | 2-3-4 | | 1-2-3-4 |
| | | Q | ( 267) | W ( 550) | W ( 769) | | |
| | | G | ( 274) | | | | |
| | | U | ( 292) | | | | |
| TOQ 476 | TOG 484 | TOU 501 | | JOQ 529 | TVQ 531 | JOG 537 | |
| Segment 5 | | 5 | | 4-5 | 3-4-5 | 2-3-4-5 | |
| | | | | G ( 236) | W ( 646) | W ( 855) | |
| | | | | U ( 393) | | | |
| | | | | Q ( 398) | | | |
| TOG 445 | JOG 498 | TVG 500 | | TNG 539 | JVG 552 | VOG 575 | |
| Segment 6 | | 6 | | 5-6 | 4-5-6 | 3-4-5-6 | |
| | | | | | G ( 466) | | |
| | | | | | U ( 484) | | |
| | | | | | Q ( 528) | | |
| TOG 676 | TOU 693 | JOG 729 | | TVG 730 | TOQ 738 | JOU 746 | |
| Segment 7 | | 7 | | 6-7 | 5-6-7 | 4-5-6-7 | |
| | | | | T ( 99) | T ( 230) | W ( 566) | |
| | | | | | J ( 249) | G ( 653) | |
| | | | | | V ( 251) | | |

-continued

| TOGETHER | | | | | |
|---|---|---|---|---|---|
| TOGT 544 Segment 8 | JOGT 597 8 | TVGT 599 | TNGT 638 7-8 | JVGT 651 6-7-8 F (162) T (205) P (225) | VOGT 674 5-6-7-8 F (279) T (323) E (346) |
| TOGF 607 Segment 9 | TOGT 650 9 | JOGF 660 8-9 L (194) | TVGF 662 7-8-9 | TOGP 670 6-7-8-9 E (119) I (269) F (325) | TOGE 678 |
| TOGE 565 Segment 10 | JOGE 618 10 L (98) Y (132) | TVGE 619 9-10 | TNGE 658 8-9-10 | JVGE 672 7-8-9-10 | VOGE 694 |
| TOGEL 663 Segment 11 | TOGEY 697 11 | JOGEL 716 10-11 T (65) J (149) V (178) | TVGEL 717 9-10-11 | JOGEY 750 8-9-10-11 | TVGEY 751 |
| TOGET 630 Segment 12 | JOGET 682 12 L (96) Y (124) | TVGET 684 11-12 | TOGEJ 714 10-11-12 D (177) R (212) A (236) | TNGET 723 9-10-11-12 | JVGET 737 |
| TOGETL 726 Segment 13 | TOGED 742 13 L (91) | TOGETY 753 12-13 K (112) X (181) A (184) | TOGER 777 11-12-13 K (291) Z (295) Y (326) | JOGETL 779 10-11-12-13 M (289) D (402) A (419) | TVGETL 780 |
| TOGETK 741 Segment 14 | JOGETK 794 14 | TVGETK 796 13-14 V (189) L (194) T (207) | TOGETX 810 12-13-14 H (165) A (179) N (267) | TOGETA 814 11-12-13-14 H (334) A (342) K (442) | TOGETLL 817 |
| TOGETH 795 Segment 15 | TOGETA 809 15 | JOGETH 847 14-15 | TVGETH 849 13-14-15 U (216) D (281) M (302) | JOGETA 862 12-13-14-15 M (334) U (362) H (381) | TVGETA 863 |
| TOGETLU 942 Segment 16 | TOGEDU 958 16 | TOGETM 964 15-16 T (71) V (204) F (205) | TOGETYU 970 14-15-16 T (317) | TOGETU 992 13-14-15-16 N (431) W (441) | TOGERU 994 |
| TOGETHT 866 Segment 17 | TOGETAT 880 17 | JOGETHT 918 16-17 | TVGETHT 920 15-16-17 F (143) T (149) P (196) | JOGETAT 933 14-15-16-17 T (380) F (380) | TVGETAT 934 |
| TOGETHF 938 Segment 18 | TOGETHT 944 18 | TOGETAF 952 17-18 | TOGETAT 958 16-17-18 | JOGETHF 990 15-16-17-18 E (163) I (208) F (275) | TOGETHP 991 |
| TOGETHE 958 Segment 19 Segment 20 | TOGETAE 972 19 20 R (383) Z (416) | TOGETHI 1003 18-19 19-20 R (199) B (367) D (450) | JOGETHE 1010 17-18-19 18-19-20 R (581) | TVGETHE 1012 16-17-18-19 17-18-19-20 R (712) U (723) | TOGETAI 1017 |
| TOGETHER 1157 | TOGETAER 1171 | TOGETHIR 1202 | JOGETHER 1210 | TVGETHER 1211 | TVGETAIR 1216 |

With this example, it is apparent that by utilizing library look-up techniques and syntactic and semantic processors, invalid character combinations would eliminate a number of character candidate strings.

Thus, as described herein, this invention uniquely allows elastic matching techniques to be applied to hand written printed characters with overlapping or run-on characteristics. The method solves the problem of recognizing or determining the end of one character and the beginning of the next where the characters are run-on or overlapped by assuming that, although the characters may overlap, each is written discretely and is completed before starting the next character. Because printed characters by definition terminate at a stroke end, the present invention considers all stroke ends as possible character segmentation points. Thus, no potential character segmentation point is missed. It is clear, however, in the example of the word "TOGETHER" that extra tests are made for characters comprising more than a single stroke. Thus, in testing for those individual segments, a number of stroke combinations are made which are essentially irrelevant to the final word. The processing time is minimizes as recognized herein by use of dictionary look-up techniques. Invalid character strings can be eliminated to reduce processing time and memory requirements.

This invention allows for stroke sequences up to a specified maximum denoted as "max-stroke" to be processed by the recognizer. In the two examples utilizing a hand written English alphabet, max-stroke is set to be 4. It is apparent, however, that the number may be varied depending on the alphabet which is employed. Thus, at each potential segmentation point, the tests are made of the current stroke, the current stroke plus the previous stoke, the current stoke plus the previous two strokes, the current stroke plus the previous three strokes, etc. up to max-stroke. Each combination is sent to the recognizer for potential character recognition. The invention then applies the technique of best cumulative score to produce a list of best word candidates. As the segments are processed, these best word candidates are maintained.

Although the described algorithm assumes that each character is completed before beginning the next, this constraint can also be relaxed. In normal handwriting, printing or script writing, a character is not always completed before beginning the next. Sometimes there are what can be referred to as delayed strokes. A delayed stroke is one which does not immediately follow the earlier stroke or strokes of the character. For example, the word "city" written in script generally has three strokes: the first is the main portion of the word, the second the dot of the i, and the third the cross of the t. In this example the second and third strokes are delayed. Nevertheless, it is generally possible to rearrange the strokes automatically so that the resulting stroke sequence is one that would be obtained from writing in a manner such that each letter is completed before beginning the next. An example of such stroke rearrangement has been disclosed in IBM/TDB Volume 26, No. 12, pages 6616-6617 May 2, 1984. By such stroke rearrangement it is possible to do away with the constraint that each character must be completed before beginning the next.

A further aspect of the invention is that the recognizer, by having various segmentations, provides alternate word choices for subsequent evaluation by such procedures as dictionary lookup and syntactic and semantic processors. This is particularly important where there is ambiguity to such a degree that no clear choice is possible without such high-level processing. For example, for cursive writing, and to some extent for printing as well, it is often not possible to distinguish between "d" and "cl" without context.

The procedure herein disclosed has been shown to operate effectively on run-on discretely written characters. In the examples shown the input contained only upper case handprinted characters.

The recognizer had prototypes for both upper and lower case in the RUN example and for only upper case in the TOGETHER example. It is clear that the technique is equally applicable to input lower case printed characters and to mixed upper and lower case. In fact, lower case handprinting is handled more easily by this technique since there are fewer strokes per character. Furthermore, the technique extends to an alphabet increased by the addition of punctuation symbols.

Finally, the technique also extends to cursive handwriting. The only addition required is a preliminary segmentation procedure that yields potential segmentations within strokes, such that true segmentation points are rarely missed at the expense of obtaining extra segmentation points. The resulting "stroke segments" are then processed by the disclosed procedure in the same manner that strokes of handprinting are processed. The notion of "stroke" need only be broadened to "stroke segment."

It is apparent that other modifications of this invention may be practiced without departing from the essential scope thereof.

I claim:

1. A method of recognizing handwritten words, a word being formed by a plurality of characters that may touch or overlap each other, each character being formed by one or more strokes comprising the steps of:
    (a) initializing an index of a current segmentation point of a character;
    (b) considering a stroke of a handwritten character having a segmentation point and incrementing said index or terminating said method when no further strokes exist to be processed.
    (c) examining recognitions on stroke sequences ending at the segmentation point corresponding to said index;
    (d) grading the results of said examination of recognitions to rank potential character choices; and
    (e) repeating steps (b) through (d) until all strokes for characters comprising a word have been processed.

2. A recognition method of claim 1 wherein said step of examining said recognitions comprises the steps of:
    ($c^i$) determining the maximum number of strokes of a character in the alphabet to be recognized;
    ($c^{ii}$) setting a register of the number of strokes to be examined by a recognizer;
    ($c^{iii}$) comparing the contents of said register with the maximum number of strokes and terminating the examination of recognitions when said register exceeds the maximum number of strokes;
    ($c^{iv}$) when said register contents are less than or equal to the maximum number of strokes, performing examination of recognitions on a sequence of strokes corresponding to the contents of said register and ending in the stroke corresponding to the stroke of the segmentation point corresponding to the contents of said index;
    ($c^v$) storing candidate characters and scores obtained during examination of recognitions; and
    ($c^{vi}$) incrementing said register of the number of strokes to be examined; and repeating steps ($c^{111}$) through ($c^{vi}$) until all stroke sequences up to the maximum number of strokes have been examined.

3. A recognition method of claim 2 wherein the step of grading the results of said examination of recognitions comprises the steps of:
    setting a counter of the number of strokes sent to the recognizer;
    comparing the contents of said counter with the maximum number of strokes and terminating the grading when said counter exceeds the maximum number of strokes; and
    when said counter contents are less than or equal to the maximum number of strokes, assembling a list recognition choices and ranking by recognition choice scores corresponding to graded results.

4. A recognition method as in claim 3 wherein the step of assembling a list of recognition choices comprises initializing a choice index,
    incrementing said choice index,
    determining whether the contents of the choice index exceed a maximum number of choices to be listed and whether the recognition choice score exceeds a reject threshold;
    if the recognition choice score exceeds said reject threshold and the maximum number of choices has not been exceeded creating a new recognition choice and inserting it into the list by increasing score and returning to the step of incrementing said choice index; and if the recognition choice score does not exceed said reject threshold and the maximum number of choices has been exceeded, processing a next sequence of strokes for grading.

5. A recognition method as in claim 3 further comprising the step of comparing the recognition choices with a list of acceptable character strings; and eliminating recognition choices having no corresponding acceptable character string.

* * * * *